United States Patent [19]

Tallant, II

[11] Patent Number: 4,584,596
[45] Date of Patent: Apr. 22, 1986

[54] TELEVISION RECEIVER ALIGNMENT SYSTEM

[75] Inventor: James C. Tallant, II, Noblesville, Ind.

[73] Assignee: RCA Corporation, Princeton, N.J.

[21] Appl. No.: 600,326

[22] Filed: Apr. 13, 1984

[51] Int. Cl.⁴ .................... H04N 17/02; H04N 17/04; H04N 9/20

[52] U.S. Cl. .................................................... 358/10

[58] Field of Search .................... 358/139, 10, 74, 65, 358/27, 29

[56] References Cited

U.S. PATENT DOCUMENTS

| | | | |
|---|---|---|---|
| 3,670,095 | 6/1972 | Arumugham | 358/10 |
| 4,263,622 | 4/1981 | Hinn | 358/74 |
| 4,277,798 | 7/1981 | Hinn | 358/33 |
| 4,309,718 | 1/1982 | Johnson | 358/10 |
| 4,331,981 | 5/1982 | Parker | 358/74 |
| 4,331,982 | 5/1982 | Parker | 358/74 |
| 4,347,528 | 8/1982 | Johnson | 358/10 |

OTHER PUBLICATIONS

Zenith Radio Corporation Technical Training Program Manual No. TP29.

*Primary Examiner*—Howard W. Britton
*Attorney, Agent, or Firm*—P. J. Rasmussen; P. M. Emanuel; R. H. Kurdyla

[57] ABSTRACT

In a television receiver, the bias of the G2 screen grid of an image displaying kinescope is adjusted to produce a black level condition for the kinescope. Prior to adjusting the screen grid bias, the normal bias voltage of both the cathode and G1 grid electrodes of the kinescope are modified to produce a predetermined cathode-to-G1 grid voltage.

7 Claims, 1 Drawing Figure

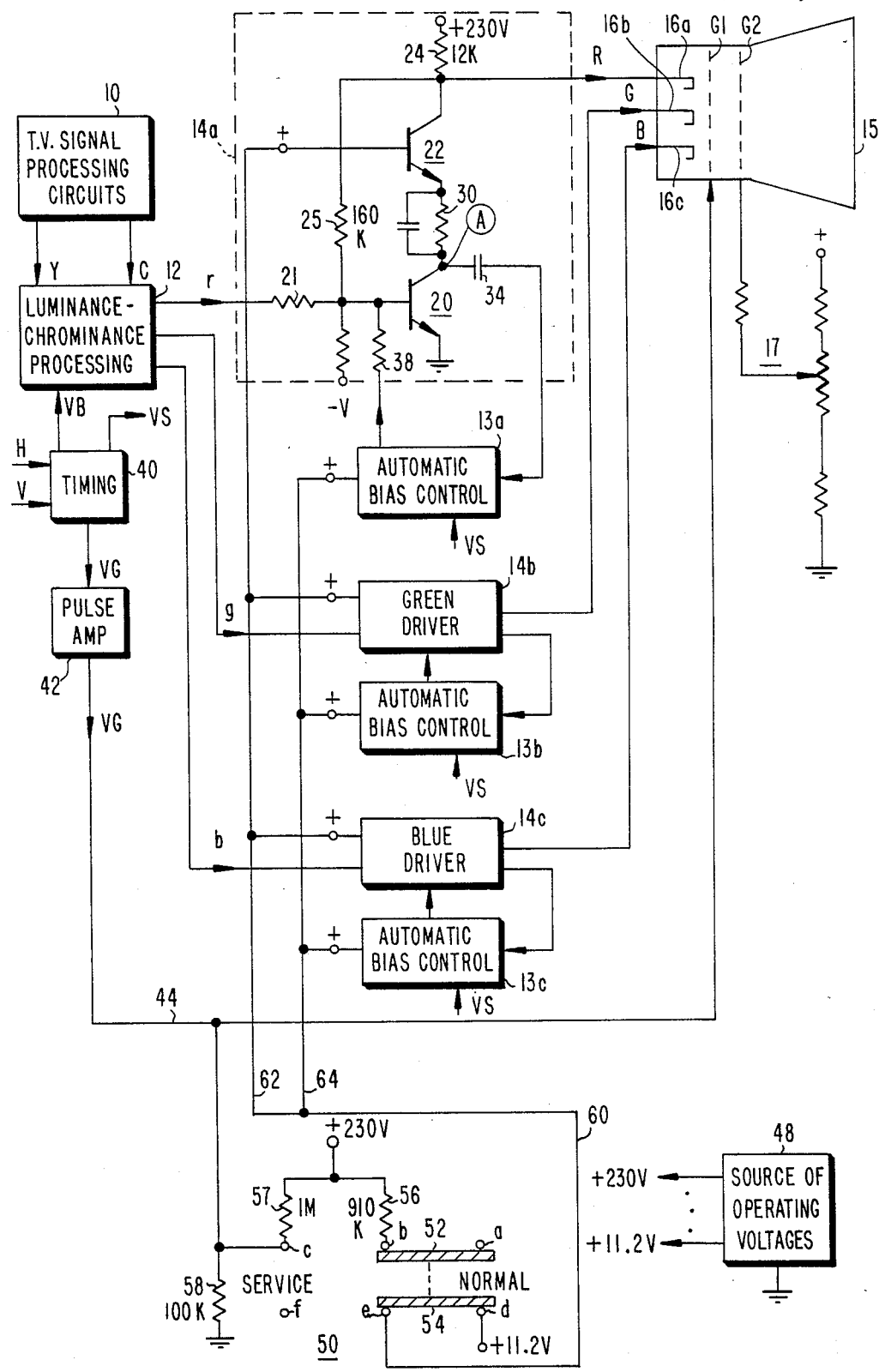

TELEVISION RECEIVER ALIGNMENT SYSTEM

This invention concerns apparatus for setting the bias of the G2 grid of a kinescope in a television receiver.

In a color television receiver having a color image reproducing kinescope with plural electron guns, the black level bias voltage of the electron guns establishes the peak beam current available from the electron guns. The black level voltage of each electron gun is related to the magnitude of the bias voltage applied to the kinescope G2 grid, also referred to as the screen grid. A color kinescope with an "in-line" electron gun structure has a G2 grid electrode energized in common to all three electron guns, while a kinescope with separate "delta-type" electron guns has separately energized G2 grid electrodes for each gun. In either case, the G2 bias voltage is often set at a value between 400 and 600 volts so that a desired cathode-to-G1 grid voltage produces a black level condition.

High brightness and high resolution in a reproduced image require a high kinescope peak beam current capability and small spot size. For each gun, peak beam current capability increases with increasing black level voltage, which is related to the G2 bias voltage. The need for high brightness and high resolution suggests that the highest available G2 bias voltage should be used, consistent with other requirements and constraints of the receiver design.

Some television receivers also employ automatic kinescope bias (AKB) control systems for maintaining a desired black level kinescope cathode bias. Such systems operate to maintain desired cathode-to-G1 grid bias for each electron gun, and should be capable of operating over a range of black level bias voltages at least as great as the maximum difference in black level voltage between any two kinescope electron guns, which can be on the order of 50 volts. To compensate for other system parameter tolerances as well, the operating range of the AKB system may be as great as 100 volts. The choice of an operating point within that range is determined by the G2 grid bias voltage. Consequently, the G2 bias voltage must be manually adjusted on each receiver to insure that the black level bias voltage of each kinescope electron gun is within the operating range of the AKB system. Furthermore, to obtain high brightness and resolution in a displayed image, the G2 bias voltage should be adjusted so as to make the black level bias voltage of the electron gun with the highest (i.e., most positive) black level voltage nearly equal to the highest useable black level bias voltage capable of being produced by the kinescope driver stages.

When adjusting the G2 screen grid bias, it is desirable to assure that adequate dynamic range in the blacker-than-black direction exists for image blanking reserve purposes, particularly in the presence of variations of the operating supply voltage for the kinescope driver circuits. It is also herein recognized that for establishing a desired cathode-to-G1 grid voltage, circuit configurations which unduly increase the cost or complexity of the system, or which compromise other aspects of system performance, should be avoided.

Consistent with these objectives, in accordance with the principles of the present invention there is disclosed herein apparatus wherein the existing bias voltages of both the kinescope G1 grid electrode and the kinescope cathode electrode are modified to produce a prescribed cathode-to-G1 voltage during alignment of the receiver when the bias of the kinescope G2 grid electrode is being adjusted.

The single FIGURE of the drawing depicts a portion of a color television receiver including kinescope bias adjusting apparatus according to the present invention.

Television signal processing circuits 10 provide separated luminance (Y) and chrominance (C) components of a composite color television signal to a luminance-chrominance signal processor 12. Processor 12 includes luminance and chrominance gain control circuits, DC level setting circuits, color demodulators for developing r-y, g-y and b-y color difference signals, and matrix amplifiers for combining the latter signals with processed luminance signals to provide low level color image representative output signals r, g and b. These signals are respectively amplified by red, green and blue video output kinescope driver amplifiers 14a, 14b and 14c of similar configuration as that shown for red driver 14a. Drivers 14a, 14b and 14c provide high level amplified color image signals R, G and B to respective cathode intensity control electrodes 16a, 16b and 16c of a color kinescope 15. In this instance kinescope 15 is of the self-converging "in-line" gun type with a commonly energized G1 grid electrode associated with each of the kinescope electron guns comprising cathode electrodes 16a, 16b and 16c, and a commonly energized G2 (screen) grid electrode.

Driver 14a includes an input common emitter amplifier transistor 20 which receives input signal r via a resistor 21, and a high voltage common base output amplifier transistor 22 which forms a cascode video output amplifier stage with input transistor 20. High level video signal R suitable for driving kinescope cathode 16a is developed across a load resistor 24 in the collector output circuit of transistor 22. A high operating potential for driver 20, 22 is provided by a source of positive DC potential (+230 volts) coupled to the collector circuit of transistor 22. Direct current negative feedback is provided from the collector output of transistor 22 to the base input of transistor 20 by means of a feedback resistor 25. The signal gain of cascode amplifier 20, 22 is primarily determined by the ratio of the value of feedback resistor 25 to the value of the input impedance of driver 20, 22 comprising resistor 21. The feedback network provides a suitably low amplifier output impedance, and assists to stablize the DC operating level at the amplifier output.

Automatic kinescope bias (AKB) control networks 13a, 13b and 13c are respectively associated with each of driver stages 14a, 14b and 14c. The automatic bias control networks exhibit similar structure and operating characteristics and serve to maintain a desired black level bias for the respective cathodes of kinescope 15. A sensing resistor 30 in series with driver transistors 20, 22 acts in conjunction with the AKB system by developing a voltage at a sensing node A representative of the kinescope cathode black current level conducted during image blanking intervals.

A timing signal source 40 associated with the AKB system responds to a horizontal line synchronizing rate signal (H) and to a vertical field synchronizing rate signal (V), both derived from deflection circuits of the receiver, for generating periodic timing signals VB, VS and VG which control the operation of the AKB function during periodic AKB control intervals. Each AKB interval begins shortly after the end of each video signal vertical retrace interval within the vertical blanking interval, and encompasses several horizontal line intervals also within the vertical blanking interval and during which video signal image information is absent as shown, for example, in U.S. Pat. Nos. 4,263,622 and 4,277,798, both of Werner Hinn.

Timing signal VB is generated shortly after the end of the vertical retrace interval, and exists for the duration of the AKB interval. This signal is applied to an input blanking control terminal of luminance-chrominance processor 12 for causing the r, g and b outputs of processor 12 to exhibit a DC reference voltage corresponding to black video signal information. This is accomplished by reducing the signal gain of processor 12 to substantially zero via the gain control circuits of processor 12 in response to signal VB, and by modifying the DC level control circuits of processor 12 to produce a black representative reference voltage at the outputs of processor 12.

Timing signal VS occurs during the AKB interval and enables sampling circuits within bias control networks 14a, 14b and 14c to operate for developing an output bias control signal representative of the magnitude of the kinescope black current.

Timing signal VG, a positive grid drive pulse, is developed during a prescribed portion of the AKB interval (e.g., comprising two horizontal line intervals within the vertical blanking interval) and is amplified by a network 42 before being coupled to the G1 grid of kinescope 15 via a conductor 44.

During each AKB interval, positive pulse VG forward biases grid G1, thereby causing the electron gun comprising cathode 16a and grid G1 to increase conduction. In response to grid pulse VG, a similarly phased, positive current pulse appears at cathode 16a during the grid pulse interval. The amplitude of the cathode output current pulse is proportional to the level of cathode black current conduction (typically a few microamperes).

The induced positive cathode output pulse appears at the collector of transistor 22. This pulse is fed back to the base input of transistor 20 through resistor 25, causing the current conduction of transistor 20 to increase proportionally while the cathode pulse is present. The increased current conducted by transistor 20 causes a voltage to be developed across sensing resistor 30. This voltage is in the form of a negative-going voltage pulse which appears at sensing node A and which is proportional in magnitude to the magnitude of the black level representative cathode output pulse.

The recovered black current representative voltage pulse is coupled from node A via an AC coupling capacitor 34 to sampling and control signal processing circuits in bias control network 13a. Keyed sample and hold circuits within network 13a are enabled by sampling timing signal VS for developing a DC bias control voltage proportional to the magnitude of the voltage pulse developed at node A. The bias control voltage is stored and is applied via a resistor 38 to a bias control input at the base of transistor 20 for maintaining a desired cathode bias voltage corresponding to a desired black level cathode current. Illustratively, if the magnitude of the induced cathode output pulse corresponds to a condition of excessive black current, the bias control voltage decreases to thereby increase the bias voltage of cathode 16a at the collector of transistor 22. This reduces the black current level to the correct level.

Networks 13a, 13b and 13c can employ signal sample and hold networks of the type described in U.S. Pat. No. 4,331,981 and in U.S. Pat. No. 4,331,982, both of R. P. Parker, and can also employ sampling and control voltage processing circuits of the type shown in U.S. Pat. No. 4,277,798 of Werner Hinn.

A double pole, double throw switch 50 for facilitating receiver alignment in a service operating mode of the receiver includes slideable contacts 52, 54 and terminals a-f. No external connections are made to switch terminals "a" and "f". A +230 volt DC potential, generated by a voltage source 48, is coupled via resistors 56 and 57 to switch terminals "b" and "c", respectively, and a resistor 58 is coupled from terminal "c" to ground. A +11.2 volt DC potential, also generated by source 48, is connected to switch terminal "d". The +230 volt DC potential coupled to switch 50 also serves as the operating supply voltage for red, green and blue driver stages 14a, 14b and 14c.

In a "normal" position of switch 50 as shown, red driver stage 14a is enabled to operate by means of the base of output transistor 22 receiving a +11.2 volt bias potential via switch terminal d, contact 54, terminal e, conductors 60, 62 and input bias terminal "+". Green and blue drivers 14b and 14c are enabled in similar fashion. In addition, in this switch position automatic bias control networks 13a, 13b and 13c are enabled to operate in response to the +11.2 volt potential being coupled to operating supply voltage input terminals (+) of networks 13a, 13b and 13c via switch 50 and conductors 60, 64. Normal bias for the G1 grid is provided by means of a voltage divider comprising the +230 volt source and resistors 57 and 58 as connected to G1 grid coupling path 44. The normal bias for the G1 grid is approximately +21 volts.

In a "service" position of switch 50 when it is desired to adjust the bias of the kinescope G2 (screen) grid via a potentiometer 17, switch contact 52 connects terminals "b" and "c" and switch contact 54 connects terminals "e" and "f". Thus the +11.2 volt source is decoupled from the bias inputs of each driver stage, whereby the upper rank video output transistor (eg., transistor 22) of each driver stage is rendered non-conductive. The +11.2 volt source is also decoupled from the operating supply voltage inputs of each of the automatic bias control networks, thereby disabling the normal operation of the bias control networks. Disabling the normal operation of the bias control networks in the service mode prevents the control networks from developing bias control voltages which could lead to an excessive, high current, bias correction in a white-going direction the moment switch 50 is returned to the normal position. In addition, resistor 56 is coupled across resistor 57 via switch contact 52, thereby modifying the normal voltage divider action of resistors 57 and 58 and changing the bias of the G1 grid to approximately +40 volts from the normally present +21 volts.

When video output transistor 22 is non-conductive, the voltage developed across load resistor 24, and thereby the bias voltage of kinescope cathode 16a, is substantially equal to +214 volts as determined by the voltage divider action of the circuit comprising the +230 volt supply potential, load resistor 24, feedback resistor 25 and the potential existing at the base electrode of transistor 20. The base of transistor 20 represents a virtual ground point, i.e., the quiescent base potential of transistor 20 corresponds to a relatively small, fixed potential equal to the sum of ground potential at the emitter of transistor 20 plus the substantially constant +0.7 volt base-emitter junction offset voltage of transistor 20.

Thus it is seen that in the "service" position of switch 50 a cathode-to-G1 grid voltage differential of +174 volts, i.e., 214 volts—40 volts, is developed. This voltage was chosen for this system in view of the need to maximize image brightness and resolution by biasing the kinescope electron guns to the highest useable black level voltage via adjustment of the G2 screen grid bias. In this case it is desired for the electron gun which exhibits the highest (most positive) black bias level to produce a black image display when the associated driver stage output is approximately 20 volts below (less positive than) the black clipping level of the driver stage, to provide a measure of blanking reserve and to accomodate the dynamic control range of the AKB system. Thus the G2 screen grid bias is adjusted such that the electron gun having the highest cutoff level. In such case the electron gun with the highest black level bias is at the black threshold when the cathode-to-G1 grid voltage is approximately +174 volts.

Screen grid bias control potentiometer 17 is initially adjusted in a white-going direction until the kinescope display screen "lights up" dimly, then potentiometer 17 is adjusted in a black-going direction until the display just extinguishes or is barely visible. When the three electron guns exhibit different conduction characteristics the display screen will "light up" with one color corresponding to that associated with the electron gun having the highest cutoff level. In such case the electron gun with the highest black level point is barely emissive. If two or more electron guns have the same conduction characteristics, then two or more colors will appear simultaneously.

Switch 50 is returned to the "normal" position after the G2 screen grid adjustment has been completed. At this time the bias of the G1 grid is reduced to the normal level of approximately +21 volts and the automatic bias control networks are enabled. Since the G2 screen grid was adjusted to produce a black display for a cathode-to-G1 grid voltage of +174 volts, and the G1 grid voltage in the normal mode is +21 volts, it is seen that in the normal mode a black level condition corresponds to a cathode voltage of +195 volts as developed at the collector output of transistor 22. It is necessary for driver 20, 22 to exhibit a blanking reserve capability in a blacker-than-black direction to assure that image retrace scanning lines are not displayed by the kinescope. Thus driver 20, 22 exhibits an additional dynamic range of approximately 20 volts for producing a maximum blacker-than-black collector potential of +214 volts when transistor 22 is cut-off. As noted previously, this +214 volt collector potential is produced during the service mode when the G2 screen grid is adjusted.

Obtaining the desired 174 volt cathode-to-G1 grid voltage in the service mode is faciliated by modifying both the bias of the kinescope cathode electrode (by rendering transistor 22 non-conductive) and the bias of the G1 grid electrode (via voltage divider resistors 56, 57, 58). In this regard it has been observed that in some receivers it may be difficult or impossible to obtain the desired cathode-to-G1 grid voltage in the service mode by modifying (i.e., reducing) the cathode bias alone, unless more costly and complicated alternative procedures are used, such as changing the values of the driver feedback impedance or the driver load impedance via a switching network, altering the base bias of output transistor 22 so that transistor 22 conducts a desired, predictable current, or reducing the value of the +230 volt supply, for example. In addition to adding excessive cost and complexity to the system, some of these alternatives may undesirably compromise system performance such as by reducing the high frequency response of the driver stages.

What is claimed is:

1. In a video signal processing system with a video channel including a video output amplifier and an image reproducing kinescope having a cathode electrode responsive to video signals coupled thereto from said video output amplifier, a G1 grid electrode, and a G2 screen grid electrode; bias alignment apparatus comprising:
    means for providing a normal bias voltage to said cathode electrode in a normal operating mode of said system;
    means for providing a normal bias voltage to said G1 grid electrode in said normal operating mode;
    means for inhibiting normal coupling of video signals to said cathode electrode in a service operating mode of said system;
    means for modifying said normal G1 grid bias voltage in said service operating mode; and
    means for adjusting the bias of said G2 screen grid in said service mode.

2. In a video signal processing system with a video channel including a video output amplifier and an image reproducing kinescope having a cathode electrode responsive to video signals coupled thereto from said video output amplifier, a G1 grid electrode, and a G2 screen grid electrode; bias alignment apparatus comprising:
    means for providing a normal bias voltage to said cathode electrode in a normal operating mode of said system;
    means including a source of operating potential for providing a normal bias voltage to said G1 grid electrode in said normal operating mode;
    means for inhibiting normal coupling of video signals to said cathode electrode in a service operating mode of said system;
    means for modifying both said normal cathode bias voltage and said normal G1 grid bias voltage in said service operating mode; and
    means for adjusting the bias of said G2 screen grid in said service mode.

3. Apparatus according to claim 2, wherein said operating potential corresponds to an operating potential for said video output amplifier.

4. Apparatus according to claim 3, wherein said neons for inhibiting is coupled to said video output amplifier for inhibiting said video output amplifier in said service mode.

5. Apparatus according to claim 4, wherein said video output amplifier comprises
    an input common emitter amplifier transistor with an input electrode for receiving video signals and an output electrode;
    an output common base amplifier transistor with an input electrode for receiving amplified video signals from said input transistor, and an output electrode coupled to said cathode electrode;
    a load impedance coupling said output electrode of said output transistor to said operating potential;
    a feedback impedance coupled from said output electrode of said output transistor to said input electrode of said input transistor; and wherein said inhibiting means inhibits the conduction of said output transistor in said service mode.

6. Apparatus according to claim 5, wherein
said modified cathode bias voltage is primarily determined by means of a voltage divider formed by said load impedance and said feedback impedance.

7. Apparatus according to claim 2, and further comprising:

automatic bias control means responsive to a signal representative of the black current level conducted by said cathode electrode during prescribed intervals for developing a bias control voltage, said control voltage being coupled to said video channel for maintaining a desired black current level; and means for inhibiting the normal operation of said automatic bias control means in said service mode.

* * * * *

UNITED STATES PATENT AND TRADEMARK OFFICE
CERTIFICATE OF CORRECTION

PATENT NO. : 4,584,596

DATED : 4-22-86

INVENTOR(S) : James Charles Tallant II

It is certified that error appears in the above-identified patent and that said Letters Patent is hereby corrected as shown below:

Column 5, line 17, last sentence should read --Thus the G2 screen grid bias is adjusted such that the electron gun with the highest black level bias is at the black threshold when the cathode-to-G1 grid voltage is approximately +174 volts.--.

Column 6, Claim 4, line 52 delete "neons" and insert --means--.

Signed and Sealed this

Fifth Day of August 1986

[SEAL]

Attest:

DONALD J. QUIGG

Attesting Officer

Commissioner of Patents and Trademarks